United States Patent [19]

Neuwirth

[11] Patent Number: 5,087,320
[45] Date of Patent: Feb. 11, 1992

[54] ULTRASONIC ROTARY HORN HAVING IMPROVED END CONFIGURATION

[75] Inventor: Joseph G. Neuwirth, Cumming, Ga.

[73] Assignee: Kimberly-Clark Corporation, Neenah, Wis.

[21] Appl. No.: 525,507

[22] Filed: May 18, 1990

[51] Int. Cl.$^5$ .......................................... B32B 31/00
[52] U.S. Cl. ........................ 156/580.2; 156/73.1; 156/580.1; 425/174.2; 264/23
[58] Field of Search .................. 156/73.1, 73.4, 580.1, 156/580.2; 74/155; 228/1.1, 110; 425/174.2; 264/23

[56] References Cited

U.S. PATENT DOCUMENTS

| Re. 33,063 | 9/1989 | Obeda | 156/73.1 |
|---|---|---|---|
| 3,017,792 | 1/1962 | Elmore | 78/82 |
| 3,096,672 | 7/1963 | Jones | 80/60 |
| 3,217,957 | 11/1965 | Jarvie | 228/1 |
| 3,224,915 | 12/1965 | Balamuth | 156/73 |
| 3,272,682 | 9/1966 | Balamuth | 156/580 |
| 3,292,838 | 12/1966 | Farley | 228/1 |
| 3,396,214 | 8/1968 | Crandon | 156/73.1 X |
| 3,455,015 | 7/1969 | Daniels | 29/470.1 |
| 3,550,419 | 12/1970 | Fox | 72/199 |
| 3,562,041 | 2/1971 | Robertson | 156/73 |
| 3,575,752 | 4/1971 | Carpenter | 156/73 |
| 3,620,061 | 11/1971 | Cuningham | 72/199 |
| 3,623,926 | 11/1971 | Sager | 156/73 |
| 3,677,861 | 7/1972 | Knauf | 156/380 |
| 3,678,720 | 7/1972 | Dickey | 72/160 |
| 3,733,238 | 5/1973 | Long | 156/580 |
| 3,844,869 | 10/1974 | Rust, Jr. | 156/358 |
| 3,908,808 | 9/1975 | Busker | 100/35 |
| 3,939,033 | 2/1976 | Grgach | 156/515 |
| 3,955,740 | 5/1976 | Shoh | 228/1 |
| 3,993,532 | 11/1976 | McDonald | 156/580 |
| 4,252,586 | 2/1981 | Scott | 156/73.1 |
| 4,333,921 | 6/1982 | Onishi | 156/580.1 |
| 4,404,052 | 9/1983 | Persson | 156/73.1 |
| 4,473,432 | 9/1984 | Leader | 156/582 |
| 4,534,818 | 8/1985 | Kreager et al. | 156/580.2 X |
| 4,659,614 | 4/1987 | Vitale | 428/218 |
| 4,668,316 | 5/1987 | Sager | 156/73.1 |
| 4,681,645 | 7/1987 | Fukushima et al. | 156/580.2 X |
| 4,757,227 | 7/1988 | Danley et al. | 74/155 X |

FOREIGN PATENT DOCUMENTS

| 260888 | 5/1963 | Australia . | |
|---|---|---|---|
| 1092052 | 12/1980 | Canada . | |
| 0313424 | 4/1989 | European Pat. Off. . | |
| 2259203 | 6/1974 | Fed. Rep. of Germany | 156/580.1 |
| 3147255 | 6/1983 | Fed. Rep. of Germany . | |
| 1459687 | 11/1966 | France . | |
| 42-22222 | 10/1967 | Japan | 228/110 |
| 51-69578 | 6/1976 | Japan . | |
| 58-42049 | 11/1983 | Japan . | |
| 178656 | 1/1966 | U.S.S.R. | 228/1.1 |
| 272020 | 8/1970 | U.S.S.R. . | |
| 277524 | 11/1970 | U.S.S.R. | 228/1.1 |
| 524699 | 10/1976 | U.S.S.R. | 156/580.1 |
| 670406 | 6/1979 | U.S.S.R. | 228/1.1 |
| 785-051 | 12/1980 | U.S.S.R. | 156/73.1 |
| 1018971 | 2/1966 | United Kingdom . | |

OTHER PUBLICATIONS

G. W. McMahon, J. Acoust. Soc. Am., 36, 85 (1964).

*Primary Examiner*—David A. Simmons
*Assistant Examiner*—J. Sells
*Attorney, Agent, or Firm*—William E. Maycock

[57] ABSTRACT

An ultrasonic rotary horn for continuously bonding together two or more layers of thermoplastic materials such as woven and nonwoven fabrics and films. The horn is adapted to resonate in a manner such that: 1) the excited end moves substantially in phase with the movement of the source of excitation; 2) the opposing end, whether or not it is actively excited, moves substantially out of phase with the movement of the excited end; 3) the radial work-contacting surface of the horn also moves substantially out of phase with the movement of the excited end; and 4) the horn exhibits a single nodal point at its geometric center. The horn has a concave configuration which comprises a central, circular flat portion which is concentric with the rotational axis and a convex portion between the flat portion and the radial surface. The convex portion is a curved surface having axial symmetry and a curvilinear profile in cross-section through the rotational axis.

8 Claims, 5 Drawing Sheets

ULTRASONIC ROTARY HORN HAVING IMPROVED END CONFIGURATION

CROSS-REFERENCES TO RELATED APPLICATIONS

The ultrasonic rotary horn of which the present application is an improvement is described and claimed in copending and commonly assigned application Ser. No. 07/525,523, entitled ULTRASONIC ROTARY HORN and filed of even date herewith in the names of Joseph G. Neuwirth, Thomas D. Ehlert, and Norman R. Stegelmann.

A variation of the horn of application Ser. No. 07/525,523 which is capable of significantly higher gain and radial amplitude per watt of power is described and claimed in copending and commonly assigned application Ser. No. 07/526,073, entitled HIGH EFFICIENCY ULTRASONIC ROTARY HORN and filed of even date in the name of Thomas D. Ehlert.

BACKGROUND OF THE INVENTION

The present invention relates to an ultrasonic rotary horn. More particularly, the present invention relates to an improvement in an ultrasonic rotary horn having unique characteristics when operated at a frequency in the range of from about 18 to about 60 kHz, which improvement defines the configuration of the ends of the horn.

The ultrasonic rotary horn described in above-referenced application Ser. No. 07/525,523 is intended to be excited at a frequency of from about 18 to about 60 kHz. The horn comprises a shaped, solid metal object having a radial surface terminated by a first end and a second end, and a rotational axis, in which each of the ends is defined by a surface and the object is axially symmetrical. The horn has the following characteristics:

(A) the diameter of the horn is in the range of from about 4 cm to about 19 cm;
(B) the width of the horn at the radial surface is from about 0.6 cm to about 13 cm;
(C) the thickness of the horn at the rotational axis thereof is from about 0.6 cm to about 15 cm and is independent of the width of the horn at the radial surface;
(D) the horn has a mass in the range of from about 0.06 kg to about 30 kg; and
(E) the diameter, width, and thickness are selected for a desired frequency so that the horn, upon being excited by ultrasonic energy at such frequency which is input at the rotational axis at, and substantially perpendicular to, one or both ends, is adapted to resonate in a manner such that:
  (1) the excited end moves substantially in phase with the movement of the source of excitation;
  (2) the opposing end, whether or not it is actively excited, moves substantially out of phase with the movement of the excited end;
  (3) the radial work-contacting surface also moves substantially out of phase with the movement of the excited end; and
  (4) the horn exhibits a single nodal point at its geometric center.

When the width of the horn was of the order of 5 cm, the amplitude across the radial or work-contacting surface (i.e., the radial amplitude) was remarkably constant. As the width of the horn increased to about 10 cm, however, it was found that the radial amplitude varied significantly across the radial surface. It subsequently was discovered that the degree of variation in the radial amplitude (i.e., the variance of the horn) was significantly influenced by the configuration of the ends of the horn.

SUMMARY OF THE INVENTION

It therefore is an object of the present invention to provide an improved ultrasonic rotary horn which can be operated at an excitation frequency of from about 18 to about 60 kHz.

Another object of the present invention is to provide an improved ultrasonic rotary horn having an effective radial surface width of up to about 13 cm.

Yet another object of the present invention is to provide an improved ultrasonic rotary horn having an effective radial surface width of up to about 13 cm, which surface has a relatively constant radial amplitude profile.

A further object of the present invention is to provide an improved ultrasonic rotary horn having an effective radial surface width of up to about 13 cm, with the ratio of the average radial amplitude at the radial surface to the longitudinal amplitude applied to the horn being at least about one across the width of the radial surface of the horn.

These and other objects will be apparent to one having ordinary skill in the art from a consideration of the specification and claims which follow.

Accordingly, the present invention provides, in an ultrasonic rotary horn intended to be excited at a frequency of from about 18 to about 60 kHz, which horn comprises a shaped, solid metal object having a radial surface terminated by a first end and a second end, and a rotational axis, in which each of said ends is defined by a surface and said object is axially symmetrical, which horn has the following characteristics:

(A) the diameter of said horn is in the range of from about 4 cm to about 19 cm;
(B) the width of said horn at said radial surface is from about 0.6 cm to about 13 cm;
(C) the thickness of said horn at the rotational axis thereof is from about 0.6 cm to about 15 cm and is independent of the width of said horn at said radial surface;
(D) said horn has a mass in the range of from about 0.06 kg to about 30 kg; and
(E) said diameter, width, and thickness are selected for a desired frequency so that said horn, upon being excited by ultrasonic energy at such frequency which is input at the rotational axis at, and substantially perpendicular to, one or both ends, is adapted to resonate in a manner such that:
  (1) the excited end moves substantially in phase with the movement of the source of excitation;
  (2) the opposing end, whether or not it is actively excited, moves substantially out of phase with the movement of the excited end;
  (3) said radial work-contacting surface also moves substantially out of phase with the movement of the excited end; and
  (4) said horn exhibits a single nodal point at its geometric center;

the improvement which comprises said first end and said second end having a substantially concave configuration which comprises a central, circular, flat portion which is concentric with said rotational axis and a generally convex portion from said flat portion to said radial surface, in which:

(a) the diameter of said flat portion is at least about 20 percent of the diameter of the horn;

(b) said generally convex portion is a curved surface having axial symmetry and a curvilinear profile in cross-section through said rotational axis which lies in the triangular area defined by (i) a straight line leading from the outer boundary of said flat portion to the edge of said radial surface; (ii) a straight line which is parallel with the rotational axis and which beings at the outer boundary of said flat portion; and (iii) a straight line which is perpendicular to the rotational axis and which extends from the edge of said radial surface to said straight line parallel with the rotational axis;

(c) said horn has a variance of no more than about 20 percent across said radial surface; and (d) the ratio of the average radial amplitude to the longitudinal amplitude is at least 1.

The improved ultrasonic rotary horn of the present invention is particularly useful in continuous processes for bonding together two or more layers of thermoplastic materials, such as woven and nonwoven fabrics and films.

DETAILED DESCRIPTION OF THE INVENTION

Figure 1:
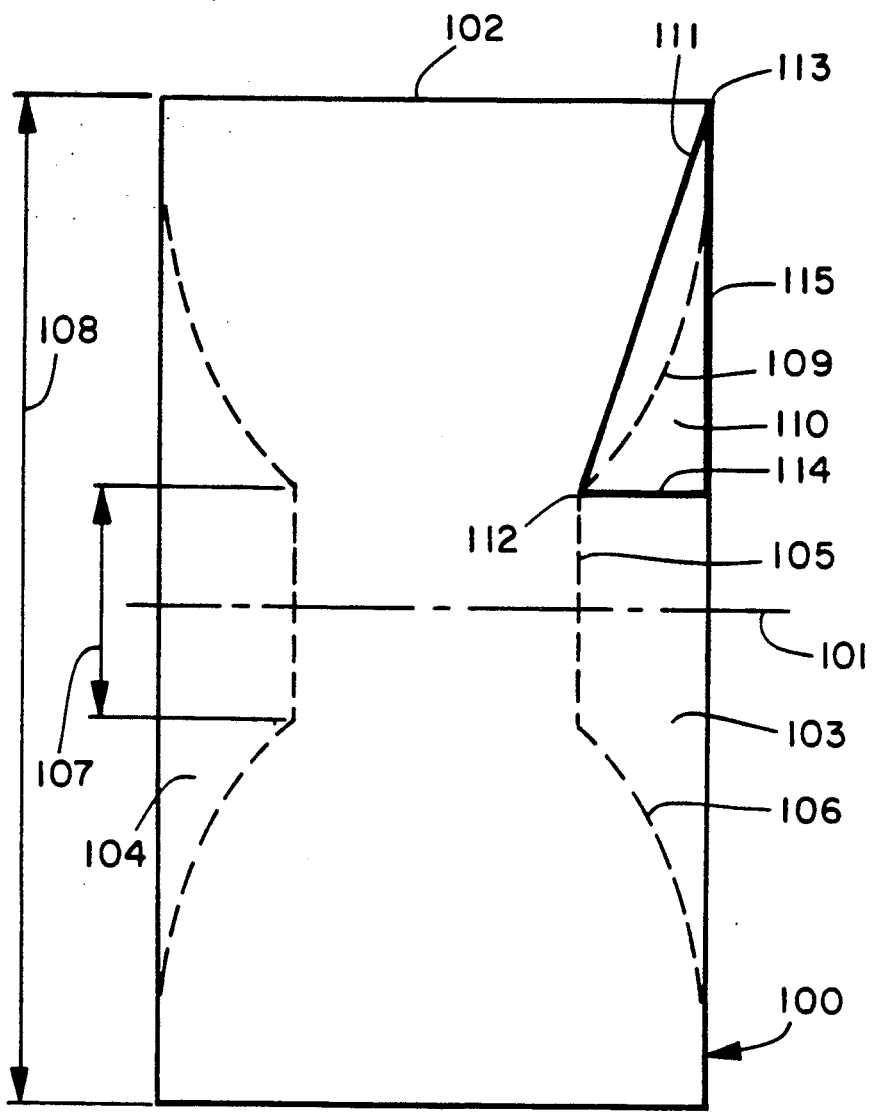
FIG. 1 is an end-view diagrammatic representation of an ultrasonic rotary horn of the present invention and illustrates the dimensional parameters of the horn.

As used herein, the terms "bonding" and "welding" are synonymous and simply refer to the substantially permanent joining of at least one layer of a material with another layer of a like or different material. The nature of the materials to be bonded is not known to be critical. However, the improved horn of the present invention is particularly useful in the bonding of two or more layers of materials selected from the group consisting of woven fabrics, nonwoven fabrics, and films which preferably are made at least in part from thermoplastic polymers. The present invention also is useful in processes involving the ultrasonic perforation of a material.

It should be apparent that adequate bonding can be achieved by a variety of mechanisms. For example, the bond can result from the partial or complete melting in the bonding zone of all of the materials to be bonded. In this case, there is partial or complete fusion in the bonding area of such materials. Alternatively, the bond can result from the partial or complete melting of one of the materials to be bonded, with the partially or completely melted material flowing into or onto adjacent materials which in turn results in a mechanical interlocking of one material with another.

As used herein, the term "fabric" is used broadly herein to mean a sheet or web of a woven or nonwoven material which may be continuous, as in a roll, or discontinuous.

The term "substantially concave" is used in relation to a surface of an end of the improved ultrasonic rotary horn of the present invention to mean that no portion of such a surface extends outwardly beyond the plane defined by the radial surface edge closest to such surface, such plane being perpendicular to the longitudinal axis of the horn.

The term "gravest mode" is used herein to mean the most fundamental resonant mode of vibration for a particular geometry under a given set of conditions.

The term "amplitude" is used herein to mean the distance of maximum displacement of a surface upon excitation, or total peak-to-peak excursion. Such displacement or excursion is reported throughout this specification in microns. The term "efficiency" is used herein to mean amplitude per watt of input or excitation power and thus has the units, microns per watt.

The terms "amplitude ratio" and "horn gain" are used interchangeably herein to mean the ratio of the average radial amplitude to the longitudinal amplitude. As applied to the ultrasonic rotary horn of the present invention, the average radial amplitude is the average amplitude of the radial surface of the horn and the longitudinal amplitude is the amplitude of an end. Unless specified otherwise, the longitudinal amplitude refers to the movement of the driven end. Because horn gain is a ratio of values having the same units, it is unitless.

The term "gain" or "booster gain" is used herein to mean the ratio of output longitudinal amplitude to input longitudinal amplitude of a booster. The term "total gain" refers to the combined gain of two boosters employed in combination. All three of these gain terms are, of course, unitless.

"Variance" is a convenient way of mathematically expressing an amplitude profile. It is a calculated value for the radial surface of the horn. Variance is calculated as the difference between the highest amplitude value and the lowest amplitude value divided by the highest value, times 100. Thus, variance is a percentage. Accordingly, the phrase "a relatively constant radial amplitude profile," as it used herein, means that the variance of the radial surface is no more than about 20 percent.

As used herein, the term "width" generally refers to the width of the radial surface or the thickness of the horn at the radial surface. The term "thickness" is used preferentially to refer to the width or thickness of the horn at the center or rotational axis of the horn. However, the terms occasionally are used more generally, but, if so used, the meanings will be clear from the context. Stated differently, unless another, broader meaning is clear from the context, each term will have the meaning specified above.

Turning now to the improved ultrasonic rotary horn of the present invention, the shaped, solid metal object which comprises the improved ultrasonic rotary horn of the present invention often is referred to herein as the horn of the present invention or, when permitted by the context, simply as "the horn" or "said horn" or variations thereof.

A driven end is an end at which the cyclic mechanical excitation is applied at the rotational axis, either directly or through a stud, axle, and/or waveguide or booster. The term "other end" means only the remaining end, whether or not that end also is a driven end. Either end may be supported, either by a suitable support means or by a waveguide or booster. Moreover, both ends may be driven ends, in which case the relationships of the ends to each other and to other surfaces still hold true, and the claims are meant to be so interpreted.

It should be apparent that the terms "first end" and "second end" are synonymous with the terms "driven end" and "other end". The first pair of terms refer to the horn structurally, while the second pair refers to the horn functionally. Thus, the horn clearly has but two ends, i.e., a "first end" and a "second end", either or both of which may be a "driven end". If only one end is a driven end, then the second end is an "other end". If both ends are driven ends, the "other end" also is a "driven end".

Upon subjecting the horn of the present invention to ultrasonic mechanical excitation, assuming that there is but a single driven end, when the source of excitation moves toward the driven end of the horn, the driven end moves away from the source of excitation. Thus, the driven end moves inwardly toward the interior of the horn (or toward the other end). The other end, however, also moves inwardly toward the interior of the horn (or toward the driven end or the source of excitation). Although both ends are moving inwardly toward the interior of the horn, they are moving in opposite directions. Thus, the movements of the ends relative to each other are said to be out of phase. The movements of the ends would be in phase if they moved in the same direction, i.e., away from the source of excitation, as the source of excitation moves toward the horn.

Consistent with the foregoing definition of "out of phase", the movements of the ends would be in phase if the ends moved in the same direction, e.g., away from the source of excitation as the source of excitation moves toward the horn. In this case, the driven end would move inwardly or toward the interior of the horn as the other end moves outwardly or away from the horn. The movement of the driven end, of course, always will be in phase with the movement of the source of excitation. Consequently, the movement of the other end always will be out of phase with the source of excitation.

When both ends are driven ends, it should be apparent to those having ordinary skill in the art that the movements of the ends with respect to each other must be synchronized with the movements just described in order to avoid imposing additional stresses within the horn.

As the source of excitation moves toward the horn with the concomitant motion of the driven end inwardly toward the interior of the horn, the movement of the radial surface of the horn of the present invention is outward or away from the rotational axis. This movement of the radial surface relative to the movement of the driven end is defined as out of phase. On the other hand, if the radial surface moved inwardly toward the rotational axis, that movement relative to the inward movement of the driven end would be defined as in phase.

It should be apparent to one having ordinary skill in the art that the above definitions of "out of phase" and "in phase" are arbitrary or subjective. What is important, however, is not the definitions selected, but how the definitions apply to different horns. This will be more evident from the examples where the movements of the radial surfaces and the driven ends are described in more detail.

Because of the movements of the ends and the radial surface of the horn of the present invention as just described, there is, when the horn is excited, a single nodal point where no motion of any kind takes place. This point lies on the rotational axis and is located at the geometric center of the horn. It is a significant distinguishing feature of the horn of the present invention.

The configuration of the radial surface of the improved ultrasonic rotary horn of the present invention typically is described herein as having a given profile. As so used, the term "profile" has reference to the line describing the radial surface when viewed in cross-section through the rotational axis of the horn. Thus, when the radial surface is flat, i.e., every point on the radial surface is equidistant from the rotational axis of the horn, the profile of the radial surface is said to be linear. Similarly, if the radial surface has been roughened, such as by grit blasting, plasma spraying, or textured chromium coating, but is otherwise substantially flat, the profile of the radial surface is substantially linear. If the radial surface is not flat, e.g., the surface has one or more raised areas (lands) or depressions (grooves or valleys), the profile is nonlinear. The term "nonlinear" is intended to be broad in scope and not limited to the embodiments just mentioned by way of illustration.

The ultrasonic rotary horn of the present invention comprises a shaped, solid metal object. In general, any metal having suitable acoustical and mechanical properties can be used. As a practical matter, however, the most suitable metals are aluminum, monel, titanium, and some alloy steels. If desired, the horn can be coated or plated with another metal to reduce abrasive wear. For applications requiring high amplitude and higher stress, titanium is preferred.

As already noted, when the width of the horn described in application Ser. No. 07/525,523 was of the order of 5 cm, the amplitude across the radial or work-contacting surface (i.e., the radial amplitude) was remarkably constant. As the width of the horn increased to about 10 cm, however, it was found that the radial amplitude varied significantly across the radial surface. By configuring the ends of such a wider horn in accordance with the present invention, the variance of the radial surface in general will be no more than about 20 percent.

Of course, the ends of a horn having a width at the radial surface which is significantly less than about 10 cm still can be configured in accordance with the present invention. In such a case, the radial amplitude will have the constancy already noted as a characteristic of the narrow horns of application Ser. No. 07/525,523. Thus, the present invention will have its greatest utility with respect to horns having a width at the radial surface of from about 5 to about 13 cm.

Thus, each end of the horn will have a substantially concave configuration which comprises a central, circular, flat portion which is concentric with the rotational axis and a generally convex portion from the flat portion to the radial surface. The diameter of the flat portion is at least about 20 percent of the diameter of the horn.

The generally convex portion is a curved surface having axial symmetry and a curvilinear profile in cross-section through the rotational axis which lies in the triangular area defined by (i) a straight line leading from the outer boundary of the flat portion to the edge of the radial surface; (ii) a straight line parallel with the rotational axis which begins at the outer boundary of the flat portion and extends outwardly away from the horn; and (iii) a straight line which is perpendicular to the rotational axis and which extends from the edge of the radial surface to the straight line parallel with the rotational axis.

These conditions for the configuration of the ends being met, the horn will have a variance of no more than about 20 percent across the radial surface and the ratio of the average radial amplitude to the longitudinal amplitude will be at least 1.

The foregoing dimensional parameters for the ends are better understood by reference to FIG. 1 which is an end-view diagrammatic representation of an ultrasonic rotary horn of the present invention and illustrates the dimensional parameters of the horn. In the figure, horn 100 has rotational axis 101, radial surface 102, and substantially concave ends 103 and 104. The broken lines show the profile of the ends in cross-section through the rotational axis. The ends are radially symmetrical and are mirror images of each other. An end consists of central, circular, flat portion 105 and generally convex portion 106. Flat portion 105 is concentric with the rotational axis and has diameter 107 which is at least about 20 percent of diameter 108 of horn 100. Generally convex portion 106 is a curved surface having axial symmetry and curvilinear profile 109 in cross-section through rotational axis 101 which lies in the triangular area 110 defined by (i) straight line 111 leading from outer boundary 112 of flat portion 105 to edge 113 of radial surface 102; (ii) straight line 114 which is parallel with rotational axis 101 and which begins at outer boundary 112 of flat portion 105 and extends outwardly from the horn; and (iii) straight line 115 which is perpendicular to rotational axis 101 and which extends from edge 113 of radial surface 102 to straight line 114. Straight line 115 lies in the plane of edge 113.

In general, such variables as the diameter, mass, width, and thickness of the horn, and the diameter of the circular flat portion and the profile of the generally convex portion of the ends of the horn, are not critical, provided that such variables come within the ranges specified herein. Such variables are critical, however, if a horn is desired which will resonate in the gravest mode at a particular frequency and with a given amplitude. Stated differently, any horn coming within the specifications provided herein will vibrate in the gravest mode at a given frequency, but that given frequency may be lower or higher than the frequency desired or considered optimum for a particular application. Vibration in the gravest mode at the desired frequency is achieved primarily by adjusting the diameter of the horn. The amplitude ratio or horn gain primarily is dependent upon the thickness:width ratio.

Although not shown in FIG. 1, each end can have a cylindrical hole centered about the rotational axis. If present, such a cylindrical hole, the flat portion of the end, and the end itself all will be concentric. If present, such cylindrical hole typically is threaded to accept a threaded stud. Alternatively, and preferably, the threaded stud, if used, will be machined as an integral part of the horn, although a stud or axle can be welded or otherwise attached to the horn, if desired. However, if a stud is present but is not machined as an integral part of the horn, the life of the horn during use is significantly reduced. If desired, the integral stud can be replaced with an integral elongated waveguide of standard design.

The use of the term "integral part" with respect to any feature or component of the ultrasonic rotary horn of the present invention means that such feature or component is formed from the same piece of material as the horn so that there are no structural discontinuities between such feature or component and the horn. Thus, any feature or component which subsequently must be attached to the horn by any means is not an integral part of the horn.

The profile of the generally convex portion of the ends of the horn can be expressed mathematically, or not, as desired. When capable of mathematical expression, such profile can be circular, second order, inverse second order, exponential, inverse exponential, catenary, inverse catenary, gaussian, inverse gaussian, combinations thereof, and the like.

When the profiles of the ends are selected as described herein, and the other parameters such as horn diameter, thickness, and width are properly selected, the horn will have a variance of no more than about 20 percent across the radial surface. In addition, the ratio of the average radial amplitude to the longitudinal amplitude will be at least 1.

Figure 2:
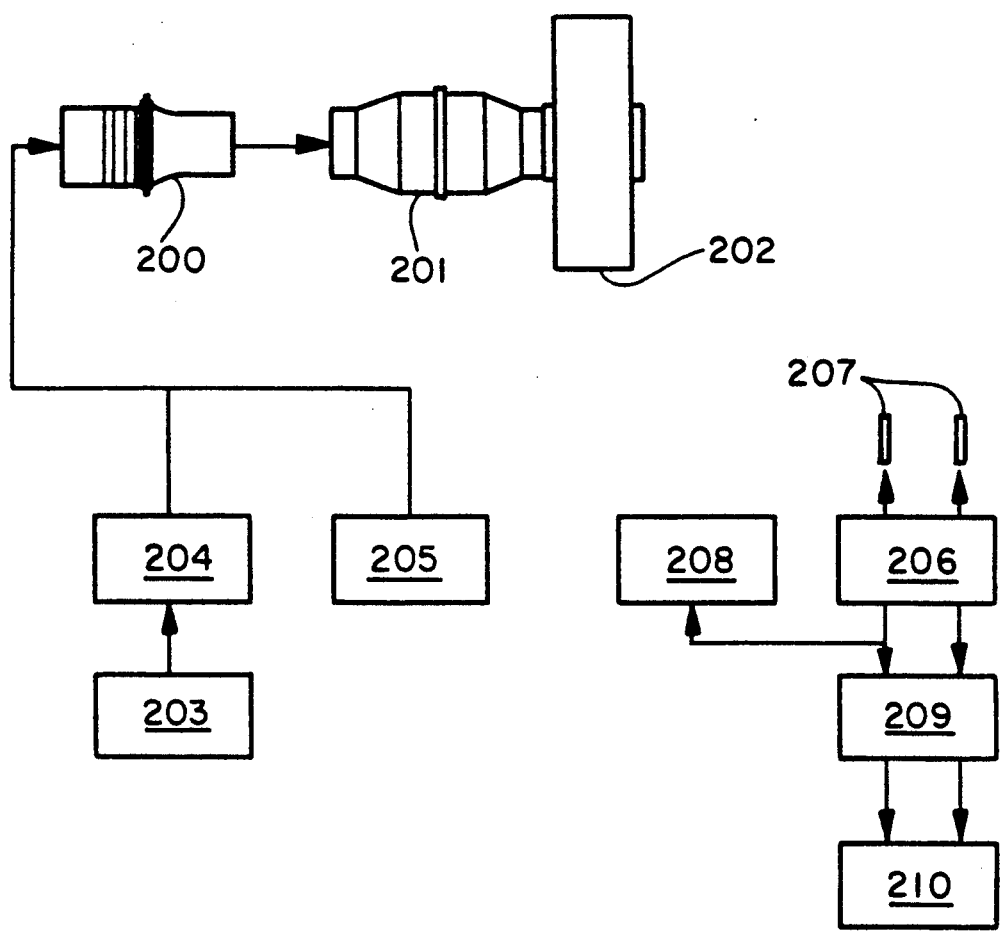
FIG. 2 is a diagrammatic representation of the experimental set-up and equipment required to measure the acoustical and mechanical properties of an ultrasonic rotary horn.

The acoustical and mechanical properties of an improved horn of the present invention are readily measured by the experimental set-up shown in FIG. 2 which includes a diagrammatic representation of the arrangement of the driver assembly, booster, and horn. Rotational displacement of the horn was accomplished by means of a piezoelectric transducer consisting of barium titanate ceramic in the conventional form of a half-wave resonator, i.e., Dukane driver assembly 200 (Part No. 110-3123, Dukane Corporation, St. Charles, Ill.). Driver assembly 200 was attached to a 2:1 booster 201, such as the Dukane booster (Part No. 2181T) or its equivalent. Booster 201 was attached to the improved rotary horn of the present invention 202.

In addition, FIG. 2 also shows schematically the auxiliary equipment required by the test procedure. Generator 203 (a Dukane 1800-watt, 20-KHz generator, Part No. 20A1800) was connected to power meter 204 (Sonic Systems Model M1/SC3 Wattmeter, Sonic Systems, Inc., Newtown, Pa.). Power meter 204 was connected to driver assembly 200. Also connected to driver assembly 200 was horn analyzer 205 (Dukane Horn Analyzer, Part No. 40A350). Displacement measuring system 206 having probes 207 (Kaman Model KD4200-1S1/1S2 SPL Displacement Measuring System, Kaman Instrumentation Corp., Colorado Springs, Colo.) was used to measure displacements at various points on each horn as described hereinafter. System 206 was connected to frequency counter 208 (B & K Precision Model 1822 Universal Counter, B & K Dynascan Corp., Chicago, Ill.) and to analog filter 209 (Wavetek Model 452 Dual Channel Hi/Lo Analog Filter, Wavetek San Diego, Inc., San Diego, Calif.). Filter 209 in turn was connected to oscilloscope 210 (Tektronix Model 5223 Digitizing Oscilloscope, Tektronix, Inc., Beaverton, Ore.).

It may be noted that some of the components shown in FIG. 2 can be replaced with equivalent equipment from, for example, Branson Sonic Power Company (Danbury, Conn.), e.g., DuKane driver assembly 200, generator 203, and booster 201. Such replacements, however, will not significantly affect either the measurement method or the results obtained.

The driver assembly, booster, and horn under test are configured as shown in FIG. 2. The system is excited by means of the horn analyzer to determine the resonant frequency of the system. The generator then is activated and the system excited for one minute to allow the system to stabilize. After the stabilization period, one displacement measuring probe is placed at the excitation input to the horn and the other probe is placed at appropriate consecutive points, primarily along the radial surface of the horn. The measurements along the radial surface typically start at 5-6 mm from the edge and are taken at approximately 6-mm intervals. With the generator on, the amplitude level, amplitude phase relative to point 1, power consumption, and frequency are recorded at each point.

The present invention is further described by the examples which follow. Such examples, however, are not to be construed as limiting in any way either the spirit or scope of the present invention.

EXAMPLE 1

A Four-Inch Wide 20 kHz Horn Lacking the Improvement of the Present Invention

In order to illustrate the problems overcome by the improved horn of the present invention, data for a four-inch wide 20 kHz horn lacking the improvement of the present invention are presented first for comparison purposes.

A horn intended to be run at about 20 kHz was machined from titanium; the horn had a width of 101.60 mm at the work-contacting surface before being tuned to operate at about 20 kHz. The thickness of the horn at the longitudinal axis was less than the width. The ends of the horn were identical, except that the end to be excited was drilled and tapped with a $\frac{3}{8}$-18NF tap 0.63-inch (about 16 mm) deep in the center to accept a threaded stud. The horn had a mass of 4.640 kg.

Figure 3:
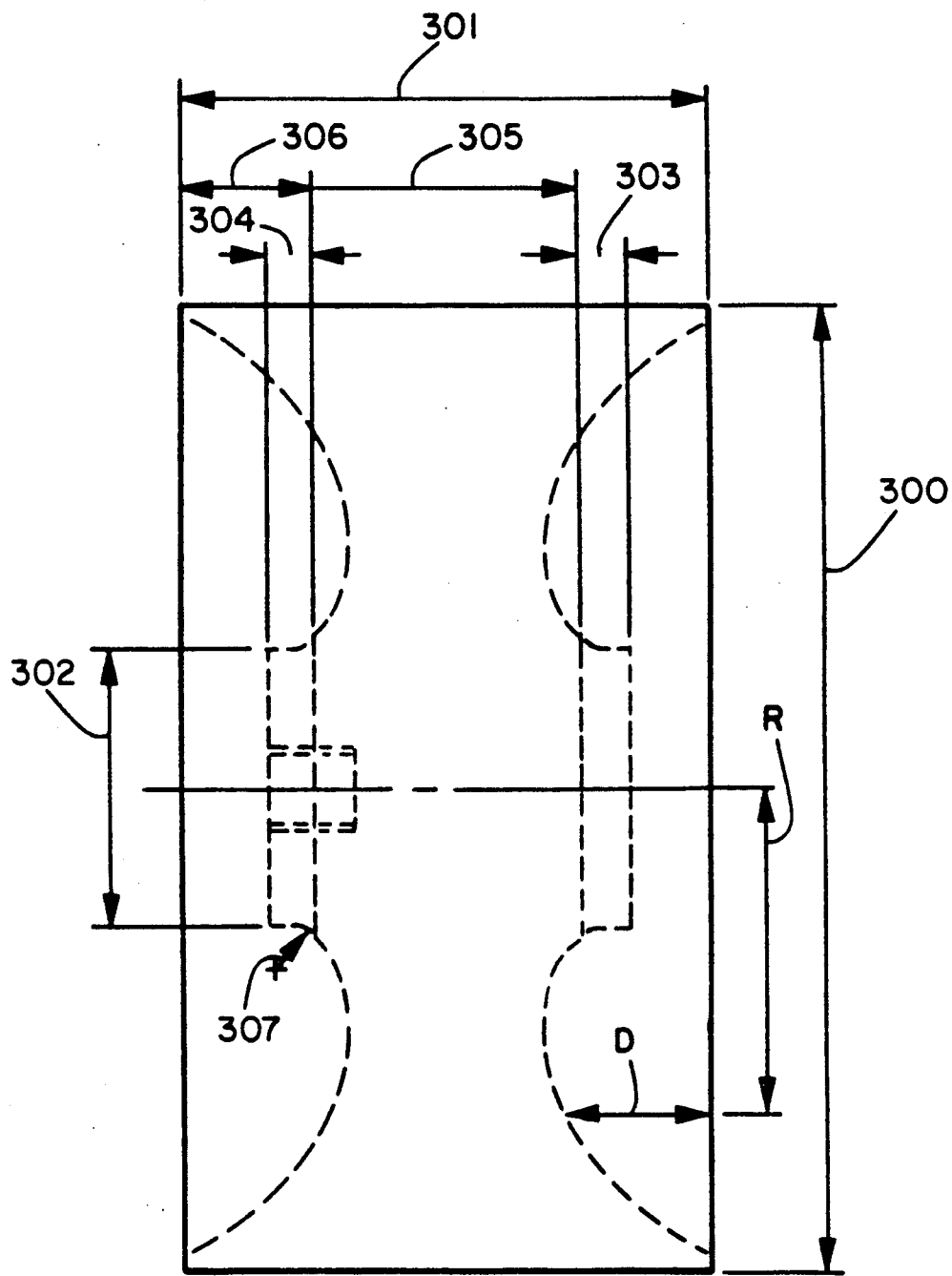
FIG. 3 is a diagrammatic representation of an ultrasonic rotary horn which lacks the improvement of the present invention and illustrates the dimensional parameters of the horn.

The dimensions in mm of the horn are given in Table 1 with reference to FIG. 3 which is an end view representation of the horn, except for the threaded stud which is not shown. The concave portions of the ends were identical and had a second order profile. It may be noted that the tuning process resulted in a reduction of the horn width from the original 101.60 mm (4 inches) to 79.38 mm (3.125 inches). For convenience, however, the horn will be referred to herein as a four-inch horn.

TABLE 1

| Dimensions of the Four-Inch Wide 20 kHz Horn of FIG. 3 | |
|---|---|
| Dimension | Value (mm) |
| 300 | 158.00 |
| 301 | 79.38 |
| 302 | 50.80 |
| 303 | 8.89 |
| 304 | 8.89 |
| 305 | 50.80 |
| 306 | 25.40 |
| 307 | 2.54 |

The values "R" and "D" in FIG. 3 are variable and define the concave portion of the ends. Thus, the value of D depends on the value of R. These profile dimensions are given in Table 2.

TABLE 2

| Concave End Profile Dimensions for the Four-Inch Wide 20 kHz Horn of FIG. 3 | |
|---|---|
| Value (mm) of R | Value (mm) of D |
| 27.94 | 14.60 |
| 30.48 | 16.25 |
| 33.02 | 17.67 |
| 35.56 | 18.84 |
| 38.10 | 19.73 |
| 40.64 | 20.39 |
| 43.18 | 20.80 |
| 45.72 | 20.95 |
| 48.26 | 20.85 |
| 50.80 | 20.49 |
| 53.34 | 19.91 |
| 55.88 | 19.04 |
| 58.42 | 17.95 |
| 60.96 | 16.58 |
| 63.50 | 14.98 |
| 66.04 | 13.13 |
| 68.58 | 11.02 |
| 71.12 | 8.66 |
| 73.66 | 5.28 |
| 76.20 | 3.17 |
| 78.74 | 0.05 |
| 79.00 | 0.00 |

The acoustical properties of the horn were measured as described above in relation to FIG. 2. Briefly, the driver assembly, boosters, and horn were configured as shown in FIG. 2, except that an additional booster was employed and the gain of booster 201 of FIG. 2 was 1:1. The system was excited by means of the horn analyzer to determine the resonant frequency of the system. The generator then was activated and the system excited for one minute to allow the system to stabilize. After the stabilization period, one displacement measuring probe was placed at the excitation input to the horn and the other probe was placed at four appropriately consecutive points along the radial surface of the horn. The fifth point represents the point of excitation input. With the generator on, the amplitude level, power consumption, and frequency were recorded at each of points 1-4, inclusive. Each of points 1 and 4 was located approximately 6 mm from the nearest edge of the radial surface. In addition, each measurement point on the radial surface of the horn was about 22-23 mm from adjacent points. Data were obtained with three different combinations of first and second boosters in order to give three different total booster gain values, the second booster being inserted between booster 201 and horn 202 of FIG. 2. Each combination differed only in the gain of the second booster. The gain of the second booster was 1:1, 1.5:1, and 2:1, respectively, for combinations 1, 2, and 3. Thus, the total gain from both boosters in each of combinations 1, 2, and 3 was 1, 1.5, and 3, respectively. The power and frequency for each booster combination are shown in Table 3. The data for the three combinations of boosters are summarized in Tables 4-6, inclusive.

TABLE 3

| Summary of Booster Combinations with the Four-Inch Wide 20 kHz Horn of FIG. 3 | | | |
|---|---|---|---|
| Combination | Total Gain | Power (watts) | Frequency (Hz) |
| 1 | 1.0 | 190 | 20,036 |
| 2 | 1.5 | 295 | 20,020 |

TABLE 3-continued

Summary of Booster Combinations with the
Four-Inch Wide 20 kHz Horn of FIG. 3

| Combination | Total Gain | Power (watts) | Frequency (Hz) |
| --- | --- | --- | --- |
| 3 | 2.0 | 470 | 20,013 |

TABLE 4

Summary of Data for the First Booster Combination
with the Four-Inch Wide 20 kHz Horn of FIG. 3

| Point | Amplitude (microns) | Horn Gain[a] |
| --- | --- | --- |
| 1 | 38.6 | 1.83 |
| 2 | 25.4 | 1.20 |
| 3 | 25.4 | 1.20 |
| 4 | 36.8 | 1.74 |
| 5 | 21.1 | — |

[a] The ratio of radial amplitude to longitudinal amplitude, the latter being represented by the amplitude value of point 5.

TABLE 5

Summary of Data for the Second Booster Combination
with the Four-Inch Wide 20 kHz Horn of FIG. 3

| Point | Amplitude (microns) | Horn Gain[a] |
| --- | --- | --- |
| 1 | 51.8 | 1.82 |
| 2 | 33.5 | 1.18 |
| 3 | 33.5 | 1.18 |
| 4 | 48.8 | 1.72 |
| 5 | 28.4 | — |

[a] The ratio of radial amplitude to longitudinal amplitude, the latter being represented by the amplitude value of point 5.

TABLE 6

Summary of Data for the Third Booster Combination
with the Four-Inch Wide 20 kHz Horn of FIG. 3

| Point | Amplitude (microns) | Horn Gain[a] |
| --- | --- | --- |
| 1 | 63.0 | 1.75 |
| 2 | 42.7 | 1.18 |
| 3 | 42.7 | 1.18 |
| 4 | 67.3 | 1.86 |
| 5 | 36.1 | — |

[a] The ratio of radial amplitude to longitudinal amplitude, the latter being represented by the amplitude value of point 5.

The variance values for each of the three booster combinations for the horn of FIG. 3 are 34, 35, and 37 percent, respectively, although the amplitude or gain across the radial surface for each combination always was greater than 1. More specifically, the average radial amplitude for each booster combination was 31.6, 41.9, and 53.9, respectively. Thus, the ratio of the average radial amplitude to the longitudinal amplitude for each booster combination was 1.50, 1.48, and 1.49, respectively.

The following example demonstrates the improvement in variance for wide horns by means of the present invention. The example utilized a titanium horn similar to that shown in FIG. 1; although not shown in FIG. 1, the horn had a threaded stud which was an integral part of the horn.

EXAMPLE 2

A Horn of the Present Invention

Figure 4:
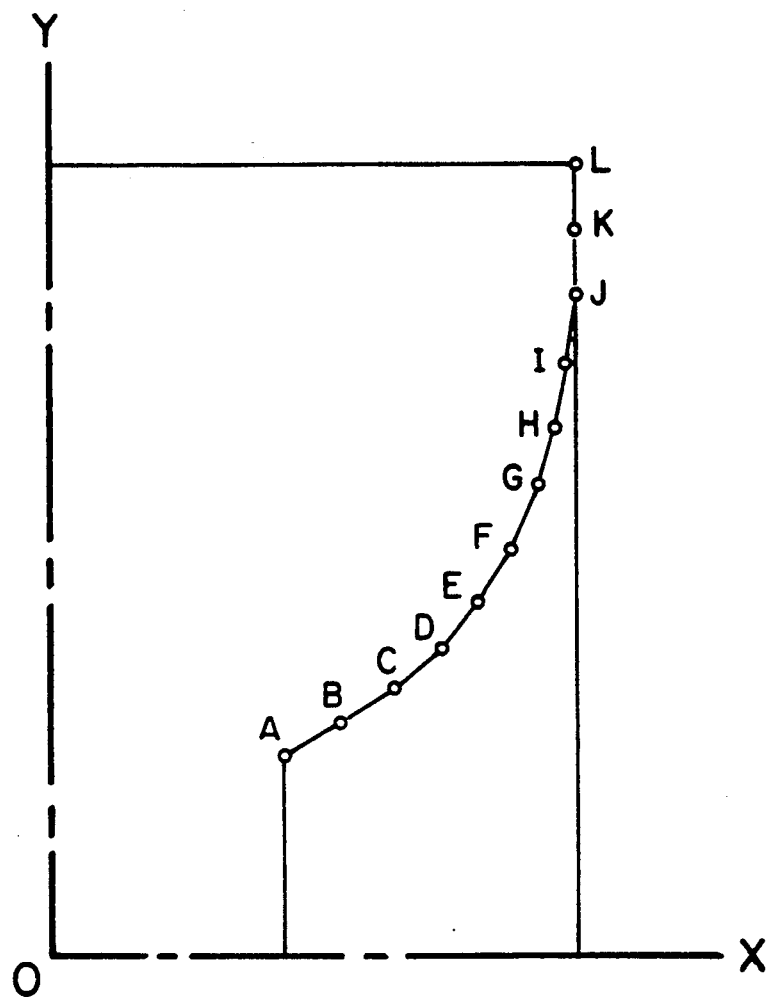
FIG. 4 is an end-view diagrammatic representation of the upper right one-fourth of a horn of the present invention and indicates the profile of the end in cross-section through the rotational axis of the horn.

The horn had a width at the radial surface of 101.60 mm (4.000 inches) and a thickness in the region of the central, flat portion of 44.45 mm. The horn diameter was 152.40 mm. The circular flat portion of the ends had a diameter of 38.10 mm. The profile of the generally convex portion of the ends is given in Table 7 with reference to FIG. 4. FIG. 4 is an end-view diagrammatic representation of the upper right one-fourth of the horn. The broken line indicates the profile of the end in cross-section through the rotational axis which is represented by X. Each of points A–L is located a distance x from a line Y which bisects the horn in a plane which is perpendicular to the radial surface. Similarly, each of points A–L is located a distance y from the rotational axis. The values of x and y are given in Table 7.

TABLE 7

Generally Convex Portion Profile Dimensions
for the Horn of the Present Invention

| Point | x (mm) | y (mm) |
| --- | --- | --- |
| A | 22.22 | 19.05 |
| B | 27.43 | 22.28 |
| C | 32.51 | 25.65 |
| D | 37.34 | 29.46 |
| E | 41.66 | 34.04 |
| F | 45.21 | 39.37 |
| G | 47.50 | 44.96 |
| H | 49.02 | 51.05 |
| I | 50.80 | 63.50 |
| J | — | — |
| K | 50.80 | 76.20 |

Measurements of the acoustical properties of the horn were carried out as already described. The first measurement on the radial surface was made about 5 mm from the edge nearest the driven end. Additional measurements across the radial surface were made at about 5-mm intervals, for a total of 19 measurements. The 20th measurement (point 20) was at the point of excitation to determine the longitudinal amplitude. The results are summarized in Table 8.

TABLE 8

Summary of Data for the Horn
of the Present Invention

| Point | Amplitude (microns) | Horn Gain[a] | Frequency (Hz) |
| --- | --- | --- | --- |
| 1 | 16.76 | 2.87 | 18,988 |
| 2 | 17.02 | 2.91 | 18,989 |
| 3 | 16.51 | 2.83 | 18,988 |
| 4 | 16.26 | 2.78 | 18,987 |
| 5 | 15.75 | 2.70 | 18,987 |
| 6 | 15.24 | 2.61 | 18,986 |
| 7 | 15.24 | 2.61 | 18,986 |
| 8 | 14.73 | 2.52 | 18,985 |
| 9 | 14.48 | 2.48 | 18,985 |
| 10 | 14.22 | 2.43 | 18,984 |
| 11 | 14.48 | 2.48 | 18,983 |
| 12 | 14.73 | 2.52 | 18,983 |
| 13 | 14.99 | 2.57 | 18,983 |
| 14 | 15.49 | 2.65 | 18,983 |
| 15 | 16.00 | 2.74 | 18,982 |
| 16 | 16.26 | 2.78 | 18,982 |
| 17 | 16.76 | 2.87 | 18,982 |
| 18 | 17.02 | 2.91 | 18,982 |
| 19 | 17.02 | 2.91 | 18,981 |
| 20 | 5.84 | — | 18,979 |

[a] The ratio of radial amplitude to longitudinal amplitude, the latter being represented by the amplitude value of point 20.

Figure 5:
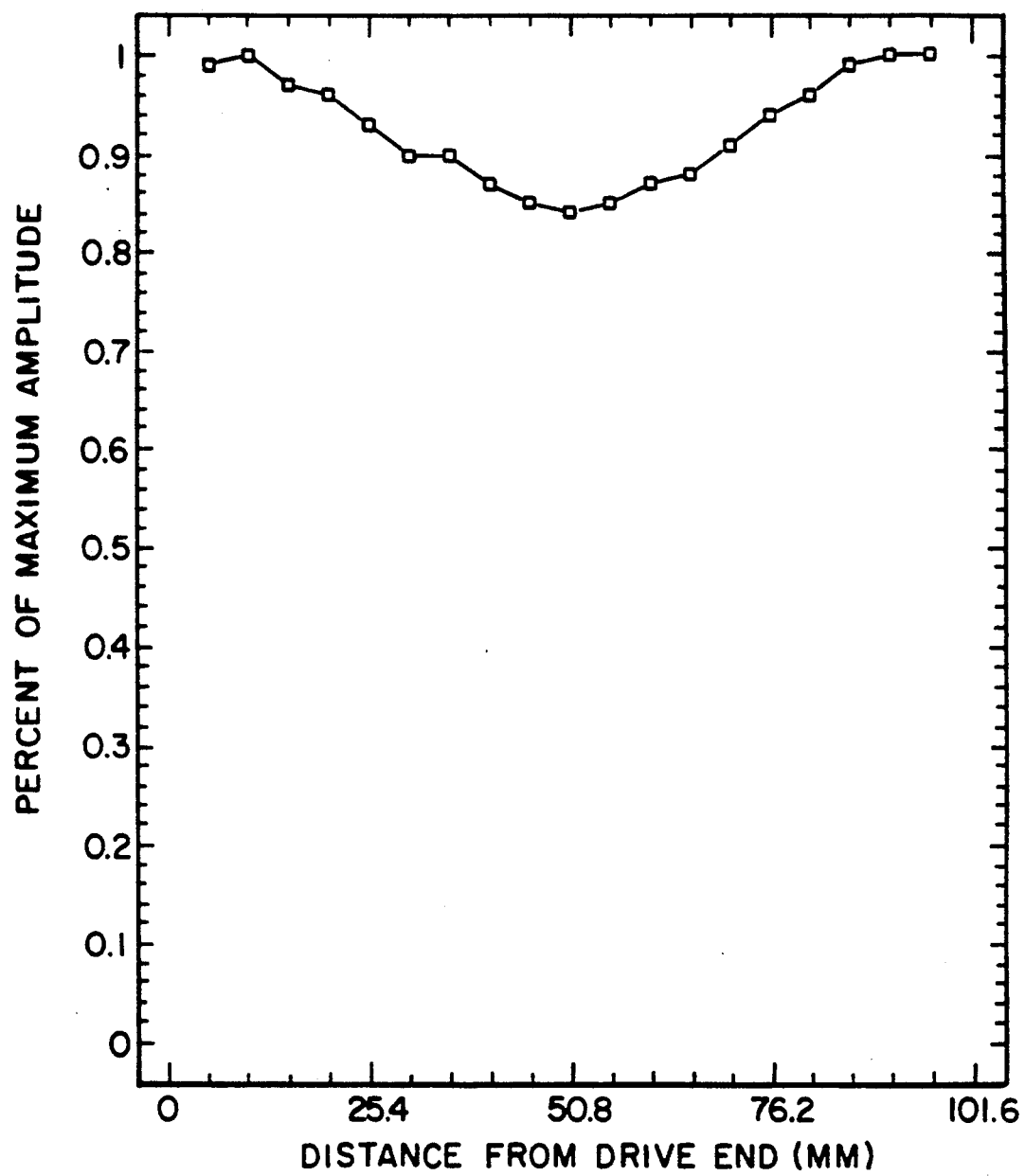
FIG. 5 is a plot of the percent of maximum amplitude across the radial surface of a horn of the present invention versus distance from the driven end.

The radial amplitude values in Table 8 were converted to percent of maximum amplitude values as shown in Table 9 and plotted as percent of maximum amplitude versus distance from driven end as shown in FIG. 5.

TABLE 9

Percent of Maximum Amplitude Values for the Horn of the Present Invention

| Point | Percent of Maximum Amplitude |
|---|---|
| 1 | 99 |
| 2 | 100 |
| 3 | 97 |
| 4 | 96 |
| 5 | 93 |
| 6 | 90 |
| 7 | 90 |
| 8 | 87 |
| 9 | 85 |
| 10 | 84 |
| 11 | 85 |
| 12 | 87 |
| 13 | 88 |
| 14 | 91 |
| 15 | 94 |
| 16 | 96 |
| 17 | 99 |
| 18 | 100 |
| 19 | 100 |

From the data in Table 8, the variance was determined to be 16 percent. The average radial amplitude was 15.73. Thus, the ratio of the average radial amplitude to the longitudinal amplitude was 2.69.

While the invention has been described in connection with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. In an ultrasonic rotary horn intended to be excited at a frequency of from about 18 to about 60 kHz, which horn comprises a shaped, solid metal object having a radial surface terminated by a first end and a second end, and a rotational axis, in which each of said ends is defined by a surface and said object is axially symmetrical, which horn has the following characteristics:
   (A) the diameter of said horn is in the range of from about 4 cm to about 19 cm;
   (B) the width of said horn at said radial surface is from about 0.6 cm to about 13 cm;
   (C) the thickness of said horn at the rotational axis thereof is from about 0.6 cm to about 15 cm and is independent of the width of said horn at said radial surface;
   (D) said horn has a mass in the range of from about 0.06 kg to about 30 kg; and
   (E) said diameter, width, and thickness are selected for a desired frequency so that said horn, upon being excited by ultrasonic energy at such frequency which is input at the rotational axis at, and substantially perpendicular to, one or both ends, is adapted to resonate in a manner such that:
   (1) the excited end moves substantially in phase with the movement of the source of excitation;
   (2) the opposing end, whether or not it is actively excited, moves substantially out of phase with the movement of the excited end;
   (3) said radial work-contacting surface also moves substantially out of phase with the movement of the excited end; and
   (4) said horn exhibits a single nodal point at its geometric center;

the improvement which comprises said first end and said second end having a substantially concave configuration which comprises a central, circular, flat portion which is concentric with said rotational axis and a generally convex portion from said flat portion to said radial surface, in which:
   (a) the diameter of said flat portion is at least about 20 percent of the diameter of the horn;
   (b) said generally convex portion is a curved surface having axial symmetry and a curvilinear profile in cross-section through said rotational axis which lies in the triangular area defined by (i) a straight line leading from the outer boundary of said flat portion to the edge of said radial surface; (ii) a straight line parallel with the rotational axis which begins at the outer boundary of the flat portion and extends outwardly away from the horn; and (iii) a straight line which is perpendicular to the rotational axis and which extends from the edge of said radial surface to said straight line parallel with the rotational axis;
   (c) said horn has a variance of no more than about 20 percent across said radial surface; and
   (d) the ratio of the average radial amplitude to the longitudinal amplitude is at least 1.

2. The ultrasonic rotary horn of claim 1, in which a stud protrudes from one end and is concentric with said end.

3. The ultrasonic horn of claim 2, in which said stud is an integral part of said horn.

4. The ultrasonic rotary horn of claim 3, in which said stud is threaded.

5. The ultrasonic rotary horn of claim 1, which the width of said horn at said radial surface is from about 5 to about 13 cm.

6. The ultrasonic rotary horn of claim 5, in which a stud protrudes from one end and is concentric with said end.

7. The ultrasonic horn of claim 6, in which said stud is an integral part of said horn.

8. The ultrasonic rotary horn of claim 7, in which said stud is threaded.

* * * * *

UNITED STATES PATENT AND TRADEMARK OFFICE
CERTIFICATE OF CORRECTION

PATENT NO. : 5,087,320

DATED : February 11, 1992

INVENTOR(S) : J.G. Neuwirth

It is certified that error appears in the above-identified patent and that said Letters Patent is hereby corrected as shown below:

Column 3, line 13, "beings" should read --begins--;

Column 4, line 51, "as it used" should read --as it is used--;

Column 10, line 56, "1.5, and 3," should read --1.5, and 2,--;

Column 14, line 45, "1, which" should read 1, in which.

Signed and Sealed this

Thirteenth Day of July, 1993

Attest:

MICHAEL K. KIRK

Attesting Officer

Acting Commissioner of Patents and Trademarks